April 5, 1960 H. RIEDEL 2,931,118
DIAPOSITIVE FRAME
Filed April 21, 1958 3 Sheets-Sheet 1
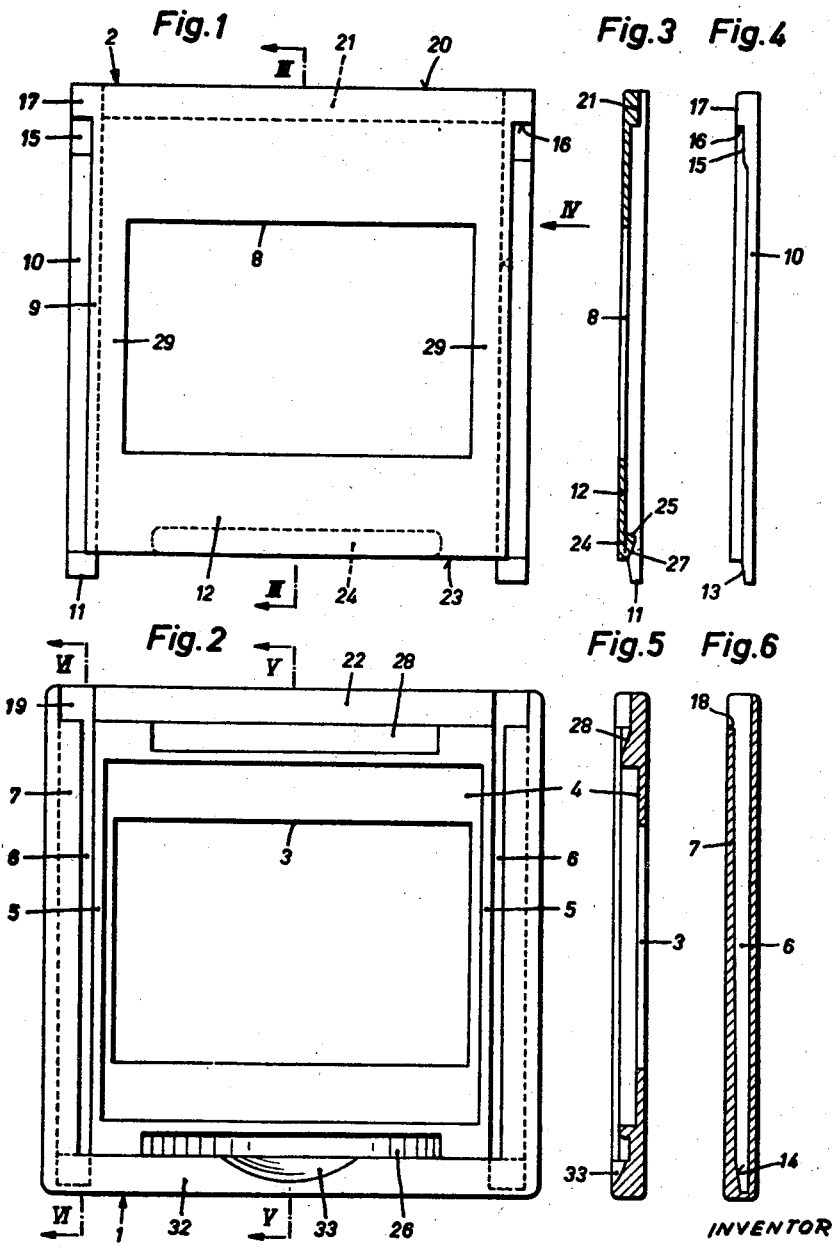
INVENTOR
H. Riedel
ATTYS.

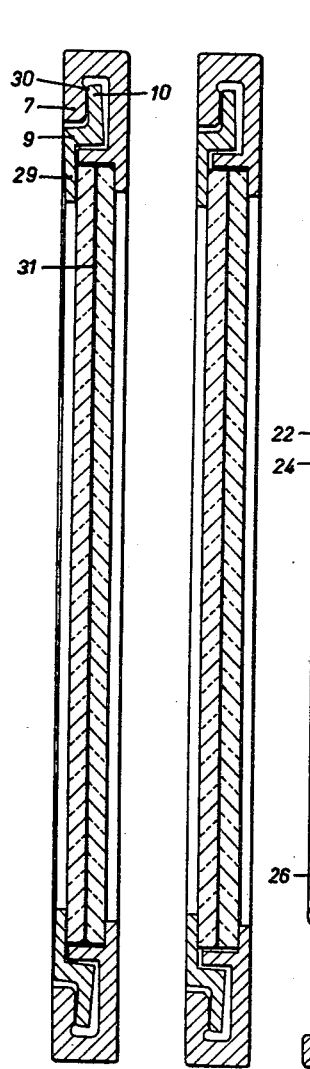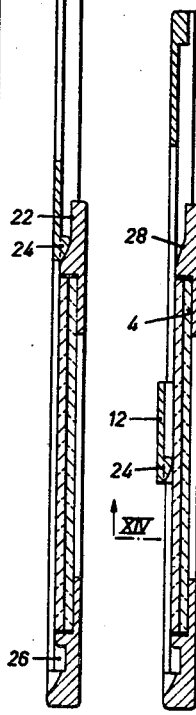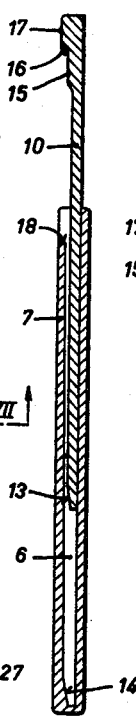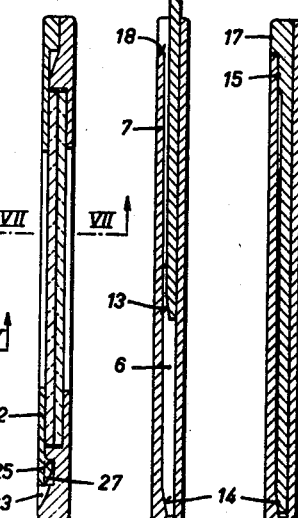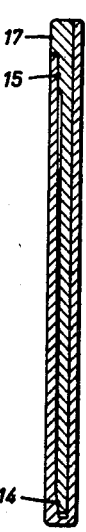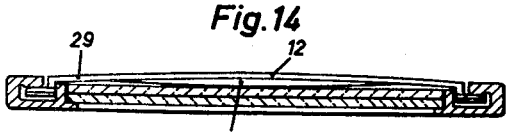

April 5, 1960     H. RIEDEL     2,931,118

DIAPOSITIVE FRAME

Filed April 21, 1958     3 Sheets-Sheet 3

INVENTOR

H. Riedel

ATTYS.

United States Patent Office 2,931,118
Patented Apr. 5, 1960

2,931,118

DIAPOSITIVE FRAME

Herbert Riedel, Berlin-Zehlendorf, Germany

Application April 21, 1958, Serial No. 729,637

Claims priority, application Germany March 25, 1958

11 Claims. (Cl. 40—152)

Two-part diapositive holder frames constructed on the slide principle, i.e. comprising a frame part and a cover part adapted to be slid into the frame part, are becoming increasingly popular. It has been found, however, that these known diapositive frames do not satisfy in all respects the requirement that the film should lie flat between and in contact with the two cover glass plates. This is connected with the fact that the commercially available diapositive glasses can be made only with relatively large thickness tolerances of ±0.10 mm. unless one is prepared to meet excessively high manufacturing costs, so that if the minus tolerances coincide, that is to say, if each of the cover glasses has a thickness that is below the nominal thickness, a free space amounting, in the most unfavourable case, to as much as 0.40 mm. can occur in the film bed layers.

This has the disadvantage that the sliding cover provided with lateral sliding runners, does not form a perfectly satisfactory closure device, owing to its straight-line guiding means which are rectilinear on all sides and, more particularly, are kept fixed and parallel to the top boundary of the film bed, because the large free space occurring in unfavourable cases does not allow the film to be held flat by the cover glasses.

This defect is avoided, according to the invention, by making use of the bending resiliency of the material of the sliding cover; the runners formed at an angle are not made at right angles to the cover plane, as before, but are formed at a larger angle, i.e. at an acute angle to the cover plane, so that the runners are also at an acute angle to the runner guiding grooves of the frame part. It is also possible to go further; not only the runners formed at an angle, but also the runner carriers which normally extend at right angles to the runners, can be made at a larger angle to the cover plane.

This construction of the runners and runner carriers of the sliding cover has the advantage that by this means an initial stress is produced which in every case exerts a pressure, in the direction of the film bed, on the film and the glasses, and can compensate even for negative tolerances of the glass plates. Because of the initial stress, the film is kept in a very flat position owing to the transmission of pressure, and this is of considerable importance in that it permits picture projection without distortion and also tends to prevent the formation of Newton's rings.

The advantageous effect of the initial stress is further assisted and completed by the fact that in accordance with a further feature of the invention the sliding runners of the sliding cover terminate in a wedge-shaped part both at their front and at their rear ends. As a result of this, on the one hand the cover can be very easily slid into the frame part, and on the other hand the inclined wedge surfaces run on to or under correspondingly shaped inclined opposing surfaces of the frame grooves with firm contact, in the closed position.

Practical experience has shown that although substantial advantages are achieved by this construction, the inclined slide surfaces exert a resilient action mainly on those parts of the glass plates that are adjacent to the plate edges. As a result of this, the slide plane surfaces bend outwards to a greater or less extent, so that dust can get in from the window or aperture edges. This undesired outward bending is due to the fact that the elasticity moments, more especially in the case of the multiple mould used in making the frame parts and more particularly the sliding cover, cannot be calculated and determined in advance with sufficient accuracy to make the slide retain its original flat position, with respect to the glass plates, even after it has been slid into the frame part. This behaviour, i.e. this outward bending of the sliding cover, is made still more disadvantageous by the fact that the positive or negative tolerances in the thickness of the glass plates have to be taken into consideration; a relatively pronounced outward bending of the slide plane surface will be observed more particularly if the positive tolerances of the two plates coincide.

In order to remove these disadvantages, according to a further feature of the invention, in addition to the inclined position of the sliding runners the sliding cover, instead of being made so that its surface is flat when in the unstressed state, is so formed as to have a concave curvature, directed towards the cover frame, when in the unstressed state. This ensures that after the cover has been slid into the frame there will be a larger or smaller initial stress depending on the plate thickness, which will be within the tolerances; this stress will result not only from the upward bending of the inclined runners but also from the fact that those parts of the slide which have a concave shape have been bent back towards a flat position. This initial stress in all parts of the frame has the result that a continuous pressure is exerted not only on the edge regions of the glass plates but in every place in which parts of the slide come into contact with the glass surface, i.e. in the region of the whole picture window or aperture, and of the closure. The co-operation of these factors not only permits extremely efficient exclusion of dust, because there are no gaps anywhere between parts of the cover and the glass plates, but also keeps the film very flat irrespectively of the positive or negative tolerances, because a substantial pressure, which is relatively uniform in all parts, is exerted on the film. Practical tests have shown that by this means pictures are obtained which are very free from distortion, and more particularly Newton's rings are also largely avoided.

It is advisable not only to provide the concave curvature on the slide in the region above and below the window opening, but also to make this concave curvature extend right up to the runners, since this ensures still better firm contact or contact pressure of all parts of the sliding cover against the glass plates.

In order to make this resilient returning action particularly effective, it is advisable to obtain good outward resilient movement of the inclined sliding runners and of the other parts of the sliding cover by making the vertically extending runner guiding grooves merge directly into the cam grooves extending at right angles to the guiding grooves and provided at the top and bottom of the frame part, and to dispense with the partition rails hitherto provided at the transitions from the runner guiding grooves to the cam grooves. By this means an uninterrupted dust arresting groove is also obtained, in which any dust that gets in can collect, so that the risk of dust being able to get in between the glass plates and the film is largely avoided.

A further feature of the invention consists in the novel locking of the sliding cover to the frame part by means of a curved cam which is arranged on the inner side of the sliding cover in the vicinity of the slide tongue and in the closed position snaps into and thereby engages in a corresponding catch cavity on the inner side of the frame part. For this purpose the resiliency of and the bending stress in the sliding cover material in the region of the tongue portion is made use of, in such a manner that when the sliding cover is put in, the tongue tip is moved resiliently outwards, through a distance equal to the cam height, by running on to an inclined surface. This has the advantage that in the course of the further closing movement of the cover the cam pressure due to the bending stress in the cover part is effectively used, while the cam is sliding over one of the glass plates, to prevent the glass plate from accidentally slipping out in the direction in which the cover is being pushed. Lastly, in the end position the bending stress in the cover part produces the result that reliable locking engagement between the curved cam and the catch cavity is ensured by resilient returning action.

The dimensions of the engaging cam on the slide tongue, more particularly the run-off and boundary curves, are made such that in accordance with the invention in addition to effecting the actual engagement they also perform the function of strengthening the sliding cover and therefore act as a reinforcing rib, which provides an increase in the resilient tensile force and serves as an edge reinforcement of that part of the sliding cover which is inherently the weakest, i.e. the tongue part.

In order to ensure secure closure and also easy dismantling, the curved cam may be given a lenticular shape with a vertical inwardly directed cam contact surface which bears against a corresponding vertical contact surface in the upper cam engagement groove when the sliding cover is slid in. This provides a broad locking base and particularly secure interengagement.

For reasons of cost, polystyrenes of class VI, or plastics of similar composition, which in their fundamental composition have the colour of clear glass, have hitherto been used for diapositive frames. But since frames of this kind were unsuitable, they were made very opaque by the addition of colouring pigments. But the addition of these pigments to the material of diapositive frames brought about the undesired secondary effect that when the frames were used in projectors giving a strong light the heat resistance of the frames was very close to the lower limit.

In accordance with the invention, these disadvantages are avoided by the fact that the only colouring pigment used is titanium. This, in contradistinction to the colouring pigments usually added, does not reduce the heat resistance of the frames but actually increases this resistance, so that not only is it possible to use projectors giving a strong light, but also the frames can be used under the very much more unfavourable conditions of a tropical climate, and at the same time there is a sufficient reserve in view of the higher temperatures in the tropics. The amount of titanium added is as large as is possible without making the material incapable of being subjected to the required injection-moulding process.

Further details of the invention will appear in the course of the following description with reference to the accompanying drawings, in which:

Figure 1 is a plan view of the top side of the sliding cover;

Figure 2 is a plan view of the frame part of the diapositive holder frame;

Figure 3 is a cross-section through the sliding cover, on line III—III of Figure 1;

Figure 4 is a side elevation of the sliding cover, seen in the direction of the arrow IV of Figure 1;

Figure 5 is a cross-section through the frame part of the diapositive holder frame, on line V—V of Figure 2;

Figure 6 is another section through the frame part on line VI—VI of Figure 2;

Figure 7 is a cross-section, on a larger scale, through the diapositive holder frame, with a film inserted between the cover glasses and the cover part slid in, on line VII—VII of Figure 11, with cover glasses of which the negative tolerances coincide;

Figure 8 is a cross-section similar to Figure 7, but with cover glasses of which the positive tolerances coincide;

Figure 9 is a longitudinal section through a diapositive frame at a point corresponding to the section lines III—III and V—V of Figures 1 and 2, with cover glasses inserted, in the first initial stage of insertion of the sliding cover;

Figure 10 is a cross-section similar to Figure 9, in which the sliding cover is in an intermediate insertion stage, i.e. has been slid half-way in;

Figure 11 is a cross-section through a diapositive holder frame, similar to Figures 9 and 10, in which the sliding cover is in the closed position;

Figure 12 is another section through a diapositive frame, at a point corresponding approximately to the section line VI—VI of Figure 2, in which the sliding cover has been slid about half-way into the frame part;

Figure 13 is a section similar to Figure 12, in which the sliding cover has been slid completely in;

Figure 14 is a cross-section through the diapositive holder frame, on line XIV—XIV of Figure 10;

Figure 15:
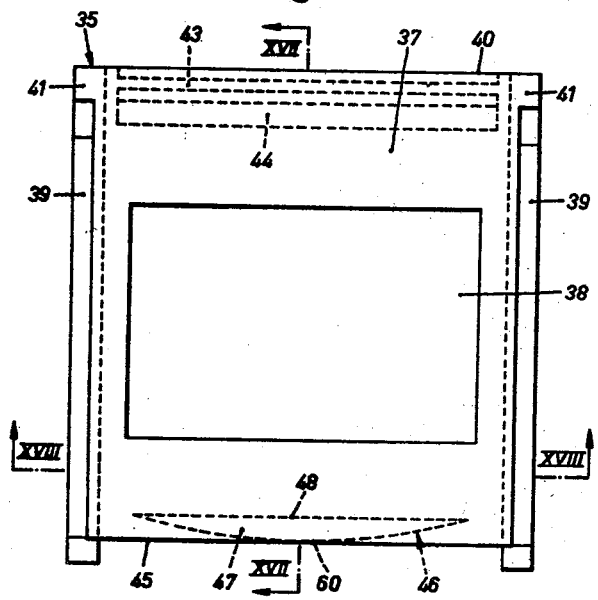
Figure 15 is a plan view of the sliding cover of a second embodiment.

The diapositive holder frame according to the invention consists, in the embodiment shown in Figures 1 to 14, of a frame part 1 and a sliding cover 2. The frame part 1 is provided with a central aperture or window 3 for the picture transparency. This window is surrounded by a film and glass bed 4 in the form of a depression or cavity in the frame part. On both sides of the bed 4, runner guiding grooves 6 are arranged as depressions in the frame part and are separated from the bed only by rails 5 and are partly closed at the top by a guiding rib 7, as shown particularly clearly in Figure 2.

The sliding cover 2 is also provided with a window 8 which lies exactly above the window 3 of the frame part 1 when the cover is slid completely in. On both sides runner carriers 9 project out of and approximately at right angles to the surface of the cover, and runners 10 are provided on and also approximately at right angles to the carriers, and therefore approximately parallel to the cover surface.

The two sliding runners extend towards the tongue and have wedge extensions 11 with one inclined surface, which project beyond the tongue portion 12; in the closed position, as shown in Figure 13, the wedge surfaces 13 of these extensions bear against corresponding wedge surfaces 14 on the frame part, whereby firm support of the sliding cover in the frame part is obtained. At the top, the runners 10 have a widened part provided with a run-on or sliding contact surface 15 which merges, by way of a step 16, into rectangular extensions 17. In the closed position of the sliding cover, the run-on surface 15 bears firmly against the inner surface of the guiding rib 7, similarly to the wedge surface 13 bearing against the upper part of the guiding rib 7, as shown in Figure 13, and the shoulders 16 of the extensions 17 bear against the top end edges 18 of the guiding ribs 7. To make this possible, the guiding rib 7 is made shorter than the frame part, so that at the top this rib is immediately adjacent to a recess 19. The thickness of the extensions 17 is made such that their top surface is flush with that of the guiding rib in the closed position, as shown in Figure 13.

For reasons connected with injection moulding technique, the runner guiding grooves 6 are made slightly wedge-shaped over the whole of their length, apart from the wedge surfaces 14 at their innermost ends, as is shown in cross-section in Figure 13.

On the inner side of the sliding cover, between the runner carriers 9 and immediately adjacent to the top edge 20 there is a depression 21 of rectangular shape which comes into contact with a correspondingly shaped flat extension 22 on the frame part when the cover is slid into the closed position. On the rear side of the cover 2, immediately adjacent to the bottom edge 23 and therefore in the region of the tongue portion 12, there is a curved cam 24 which in plan has the shape shown by the dotted line in Figure 1. The curved cam 24 is formed as a hook 25 which in the closed position (see Figure 11) engages in a catch cavity 26 at the bottom end of the frame part 1.

The curved cam extends over about two thirds of the width of the cover and decreases in height towards each end, as shown in Figure 14. Correspondingly, the catch cavity 26 also is deepest in its central part and decreases in depth towards each end, in the form of a circular segment. The curved cam 24 has on the side facing away from the hook 25 a run-on surface 27 which runs up on to a corresponding inclined surface 28 when the cover is slid into the frame part. The length of this inclined surface 28 corresponds to the length of the curved cam 24, as shown in Figure 2.

When the cover is slid in, the curved cam 24 first meets the flat extension 22. The heights of this extension and of the curved cam 24 relatively to one another are made such that the cover cam at this stage be slid in, whilst at the same time the wedge extensions 11 engage under the front ends of the guiding ribs 7, with slight clearance, i.e. without stress. Afterwards, when the cover is slid further in, the run-on surface 27 of the curved cam 24 encounters the corresponding inclined surface 28 of the frame part, so that when the cover slides further the tongue portion 12 of the flat surface 29 of the cover is curved as shown in Figure 14. Because of the stress arising in the sliding cover as a result of the curvature, the curved cam is pressed against the cover glasses as the cover is slid further in, so that the glasses are in firm contact with the film and glass bed 4 (Figure 10). When the closed position is reached, the hook 25 finally snaps into the catch cavity 26, and at the same time the tongue portion 12 of the flat surface 29 ceases to be curved, i.e. the tongue portion returns to its flat state.

In the description of the runner carriers and the runners it was stated that they extend only approximately at right angles to one another and to the cover plane surface. More precisely speaking, both the runner 10 and also the runner carrier 9 are at a larger angle to the cover plane surface 29, in such a manner that in the unstressed state, only the outermost tip of the runner 10 is in contact with the inner guiding surface of the guiding rib 7. Moreover, as shown in Figures 7 and 8, the runner guiding groove is made with substantial clearance with respect not only to the runner 10 but also to the runner carrier 9. This has the advantage that on the one hand the sliding cover can easily be slid into the guiding groove and on the other hand the two covering glasses, although they have relatively high tolerances of ±0.10 mm. for reasons connected with manufacturing technique, can be pressed against one another with sufficient stress by the cover part and the frame part. This is connected with the fact that the sliding cover can be deformed to a sufficient extent because of the larger angle both of the runner and also of the runner carrier, and because in the unstressed state only the outermost edge of the runner makes contact.

This will now be explained in further detail with reference to Figures 7 and 8. If it so happens that two cover glasses are used together which both have negative tolerances (i.e. each of the glasses has a thickness slightly less than the nominal thickness), then when the cover is slid in no deformation of the runner or of the runner carrier will occur, and nevertheless the cover plane surface 29 will lie in full contact with the edges of the upper cover glass, so that the film 31 lying between the glasses is held flat. But if it so happens that one of the cover glasses has a negative tolerance and the other cover glass has a positive tolerance, or that both glasses have positive tolerances, then when the cover is slid in the runner 10 and the runner carriers 9 will be resiliently deflected in such a manner that the larger angle between these parts becomes less, i.e. that these parts are bent so as to form almost a right angle, so that the runner 10 is now almost parallel to the guiding rib 7, and is in contact with almost the whole of the inner surface thereof, as shown in Figure 8.

From the above it can be seen that irrespectively of whether, in the most unfavourable cases, both glasses have negative tolerances or both have positive tolerances, the runner and the carrier can yield resiliently to such an extent that, without any jamming effect, in each case there is a sufficient contact pressure between the two cover glasses, which pressure both ensures that the film will lie flat and also largely prevents the formation of Newton's rings.

On the lower transverse portion 32 of the frame part there is an aperture 33 in the form of a circular segment into which the operator inserts his fingernail when he wishes to slide the sliding cover out. The fingernail can then engage under the inclined surface 27 of the curved cam 24 and cause the tongue portion 12 of the sliding cover to bulge out so that the hook 25 comes out of the catch cavity 26.

In the embodiment shown in Figures 15 to 19, the diapositive holder frame consists of a cover part 35 and a frame part 36. The cover part comprises a front cover wall 37 in which an aperture in the form of a window 38 is provided. At the sides are provided two sliding runners 39 at an angle, which merge, in the vicinity of the top edge 40 of the sliding cover, into dust-excluding extensions 41. These extensions are flush, at the top, with the cover wall 37.

A reinforcing rail 42 having a dust-arresting groove 43 is provided on the rear side of the cover, in the upper part. This groove not only serves the purpose of arresting and collecting any dust that may get in, but also gives the upper part of the sliding cover sufficient flexibility in spite of the reinforcing rail. At the bottom, the reinforcing rail 42 merges into an inclined surface 44 which comes into contact with a corresponding inclined surface of the frame part, as will be explained in more detail hereinafter.

In the vicinity of the lower edge 45 of the sliding cover, a lenticular engaging cam 46 is provided which extends over almost the whole width of the cover part and on the outside merges into an inclined run-on surface 47 and on the inside has a contact edge 48 extending at right angles to the cover wall surface.

Figures 17, 18:
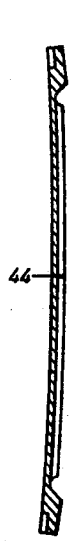
Figure 17 is a section on line XVII—XVII of Figure 15.
Figure 18 is a section on line XVIII—XVIII of Figure 15.
Figure 16:
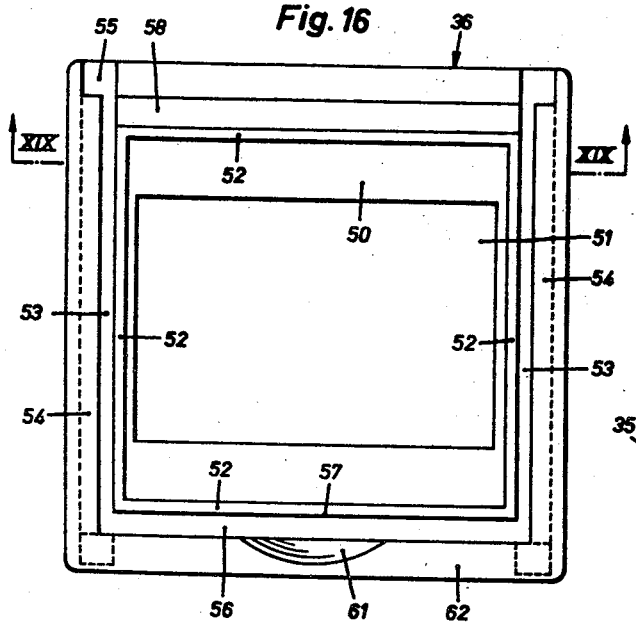
Figure 16 is a plan view of the frame part, with the sliding cover removed.
Figure 19:
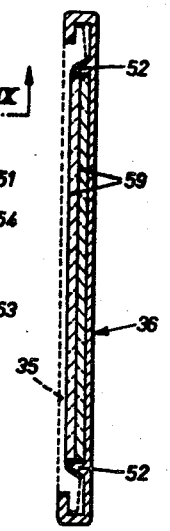
Figure 19 is a section on line XIX—XIX of Figure 16, with glass plates inserted.

As shown in Figure 17, the cover wall is made flat in a vertical direction, i.e. on section line XVII—XVII; as shown in Figure 18, the cover wall has an inwardly concave curvature when in the unstressed state.

The frame part 36 comprises a frame wall 50 in which an aperture in the form of a frame window 51 is provided. The frame wall 50 is bounded by contact rails 52 to give the glass plates and the film a correct position within the holder frame 36. Immediately adjacent to these contact rails 52 are vertically extending runner guiding grooves 53 which are partly covered, over almost the whole height of the holder frame, by guiding ribs 54. A recess 55, in which the extensions on the sliding cover engage, is provided only in the upper region. In the lower part, underneath the lower contact rail 52, there is a cam groove 56, which merges directly into the runner guiding grooves 53, no partition rails being provided. This cam groove has an upper edge 57 which extends at right angles to the frame wall; the edge 48 of the engaging cam also extends at right angles, and comes into contact with the edge 57. An inclined ramp-like run-up surface 58 is provided, which extends from the upper contact rail 52 and corresponds to the inclined surface 44 of the sliding cover.

To assemble the diapositive holder frame, the film is first placed between the two glass plates 59 and laid on the frame wall 50 of the frame part, so that the topmost surface of the top glass is flush with the contact rails 32. The sliding runners 39 of the sliding cover 35 are then slid from above into the runner guiding grooves 53 of the frame part, and the inclined run-on surface 47 of the engaging cam slides up on to the ramp-like run-on surface 58 of the frame part. For this, a slight pressure has to be exerted on the sliding cover, preferably by a light tap with the operator's finger. By this means most of the curvature in the cover wall is removed and an initial stress is imparted, and the extreme lower edge 60 of the engaging cam slides approximately over the middle of the uppermost glass plate 59 until the vertical edge 48 of the engaging cam snaps over the bottom contact rail 52 and jumps into the cam groove 56. At this moment the sliding cover is locked securely to the frame part, and at the same time a pressure, with initial stress, is exerted on the glass plates by all parts of the cover wall 37.

When the operator wishes to slide the sliding cover out again, he must insert a fingernail into the semi-lenticular aperture 61 in the lower edge of the frame part and lift the lower part of the cover wall 37 with his fingernail, at the same time holding the frame part 36 firmly at both side edges with the fingers of his other hand. During this action of lifting by means of the fingernail, upward pressure is at the same time exerted on the sliding cover, so that the engaging-cam is lifted over the bottom contact rail 52 on to the upper glass plate. He can then stop pressing with his fingernail, and only has to slide the sliding cover out upwards.

From the above it will be clear that the holder frame construction according to the present invention results in an extremely secure and satisfactory connection by locking engagement.

I claim:

1. A two-part holder frame for holding diapositives, comprising a frame part having a flat bed adapted to receive glass plates and a film, said bed being provided with two parallel runner guiding grooves, each groove having a flat guiding surface parallel to the surface of said flat bed, and a cover part having a surface, said cover part being provided with two flat elongated runners which are adapted to be slid lengthwise into the runner guiding grooves, and said runners being at an acute angle to the surface of the cover part when viewed in section on a plane transverse to their length, whereby the runners are at an acute angle to the guiding surfaces of the runner guiding grooves and use being made of the bending resiliency of the cover part to press the glass plates and the film together.

2. A holder frame as claimed in claim 1, in which the runners are connected to elongaged runner carriers which extend substantially perpendicularly to the runners when viewed in section on a plane transverse to their length.

3. A holder frame as claimed in claim 2, in which each runner guiding groove is of L-shaped cross-section, with each runner and carrier defining an L-shaped component so that clearance between the runner guiding groove and the runner and runner carrier is present on all sides except for the region of contact at the outer longitudinal edge of the runner.

4. A holder frame as claimed in claim 1 in which the runners of the cover part terminate in a wedge-shaped part at their front and at both their rear ends.

5. A holder frame as claimed in claim 1, in which a curved cam is arranged on the inner surface of the cover part, in the vicinity of the tongue portion, and a corresponding catch cavity is arranged on the inner side of the frame part in which said cam snaps in the closed position.

6. A holder as claimed in claim 5, in which a run-on surface defined by an inclined surface having a height equal to that of the cam is provided in the vicinity of the upper edge of the frame part, so that when the cover part is being pushed in and the runners are engaged in the runner guiding grooves, the cover part is bent in the region of the tongue portion and the cam slides over one of the glass plates and is pressed against this plate, so as to prevent the glass plates from slipping out in the direction in which the cover part is being pushed.

7. A holder frame as claimed in claim 5, in which said cam extends substantially the whole width of the wall part of the cover part.

8. A holder frame as claimed in claim 1, in which in addition to the inclined position of the sliding runners, the cover part is so formed as to have a concave curvature directed towards the frame part, when in the unstressed state.

9. A holder frame as claimed in claim 7, in which the concave curvature is not only provided on the cover part in the region above and below a window opening therein but also extends to a point adjacent to the runners.

10. A holder frame as claimed in claim 7, in which a cam groove provided in the bottom portion of the frame part merges directly into the runner guiding grooves, and the upper edge of the cam groove extends at right angles to the frame wall, and an engaging cam of lenticular shape on the cover part having an edge which also extends at right angles adapted to come into contact with the upper edge of the cam groove.

11. A holder frame as claimed in claim 7, in which an inclined ramp-like run-up surface is provided on the frame part and extends from an upper contact rail for the glass plates and an inclined surface arranged on the cover part to which said run-up surface corresponds.

References Cited in the file of this patent

UNITED STATES PATENTS

| | | |
|---|---|---|
| 2,639,530 | Merrill | May 26, 1953 |
| 2,651,867 | Prew | Sept. 15, 1953 |
| 2,835,061 | Riedel | May 20, 1958 |